United States Patent
McCanna et al.

(10) Patent No.: US 8,812,837 B2
(45) Date of Patent: Aug. 19, 2014

(54) APPARATUS AND METHODS FOR ACTIVATION OF COMMUNICATION DEVICES

(75) Inventors: Patrick McCanna, Carnation, WA (US); Inderpreet Singh Ahluwalia, Austin, TX (US); John Crockett, Liberty Hill, TX (US); David Harber, Austin, TX (US); Aubryn Lewis, Sammamish, WA (US); Liane F Rulifson, Seattle, WA (US)

(73) Assignees: AT&T Intellectual Property I, LP, Atlanta, GA (US); AT&T Mobility II, LLC, Atlanta, GA (US)

( * ) Notice: Subject to any disclaimer, the term of this patent is extended or adjusted under 35 U.S.C. 154(b) by 0 days.

(21) Appl. No.: 13/486,008

(22) Filed: Jun. 1, 2012

(65) Prior Publication Data
US 2013/0326214 A1 Dec. 5, 2013

(51) Int. Cl.
H04W 12/06 (2009.01)
(52) U.S. Cl.
USPC .......................................... 713/156; 455/411
(58) Field of Classification Search
USPC .......... 713/155, 156, 158, 175, 176; 726/3, 4, 726/10
See application file for complete search history.

(56) References Cited

U.S. PATENT DOCUMENTS

| | | | |
|---|---|---|---|
| 5,864,757 A | 1/1999 | Parker | |
| 7,165,718 B2 | 1/2007 | Blancas | |
| 7,302,487 B2 * | 11/2007 | Ylonen et al. | 709/229 |
| 7,861,084 B2 * | 12/2010 | Beuque et al. | 713/175 |
| 7,886,355 B2 | 2/2011 | Rager | |
| 2005/0246766 A1 * | 11/2005 | Kirkup et al. | 726/6 |
| 2006/0262929 A1 * | 11/2006 | Vatanen et al. | 380/255 |
| 2008/0003980 A1 | 1/2008 | Voss | |
| 2010/0081434 A1 * | 4/2010 | Ahluwalia | 455/435.1 |
| 2010/0255813 A1 * | 10/2010 | Belrose et al. | 455/411 |
| 2010/0275027 A1 * | 10/2010 | Belrose et al. | 713/176 |
| 2011/0258446 A1 * | 10/2011 | Brown et al. | 713/168 |
| 2012/0159578 A1 * | 6/2012 | Chawla et al. | 726/4 |
| 2013/0055347 A1 * | 2/2013 | Chawla et al. | 726/3 |

OTHER PUBLICATIONS

GSMA , "Embedded SIM Task Force Requirements and Use Cases", Feb. 21, 2011.

* cited by examiner

*Primary Examiner* — Cordelia Zecher
*Assistant Examiner* — Richard McCoy
(74) *Attorney, Agent, or Firm* — Guntin & Gust, PLC; Douglas Schnabel

(57) ABSTRACT

A method that incorporates teachings of the subject disclosure may include, for example, storing, by a universal integrated circuit card (UICC) including at least one processor, a digital root certificate locking a communication device to a network provider, and disabling an activation of the communication device responsive to receiving an indication of a revocation of the stored digital root certificate from a certificate authority, wherein the indication of the revocation of the stored digital root certificate is associated with a revocation of permission for an identity authority to issue a security activation information to the communication device on behalf of the network provide. Other embodiments are disclosed.

12 Claims, 9 Drawing Sheets

800

APPARATUS AND METHODS FOR ACTIVATION OF COMMUNICATION DEVICES

FIELD OF THE DISCLOSURE

The subject disclosure relates generally to an apparatus and methods for activation of communication devices.

BACKGROUND

Network operators generally provide subscribers with subscriber identity modules (SIM), which enable authentication and access by a communication device to provider's network. SIMs commonly assist network providers in tracking service usage for efficient collection of service fees. The collection of these service fees from subscribers is economically critical to network providers. Subsidized communication devices are often provided to subscribers and represent significant costs to network providers. Generally, network providers desire to insure that these communication devices are only used on their networks to maximize return on investment.

BRIEF DESCRIPTION OF THE DRAWINGS

Reference will now be made to the accompanying drawings, which are not necessarily drawn to scale, and wherein.

DETAILED DESCRIPTION

Figure 1:
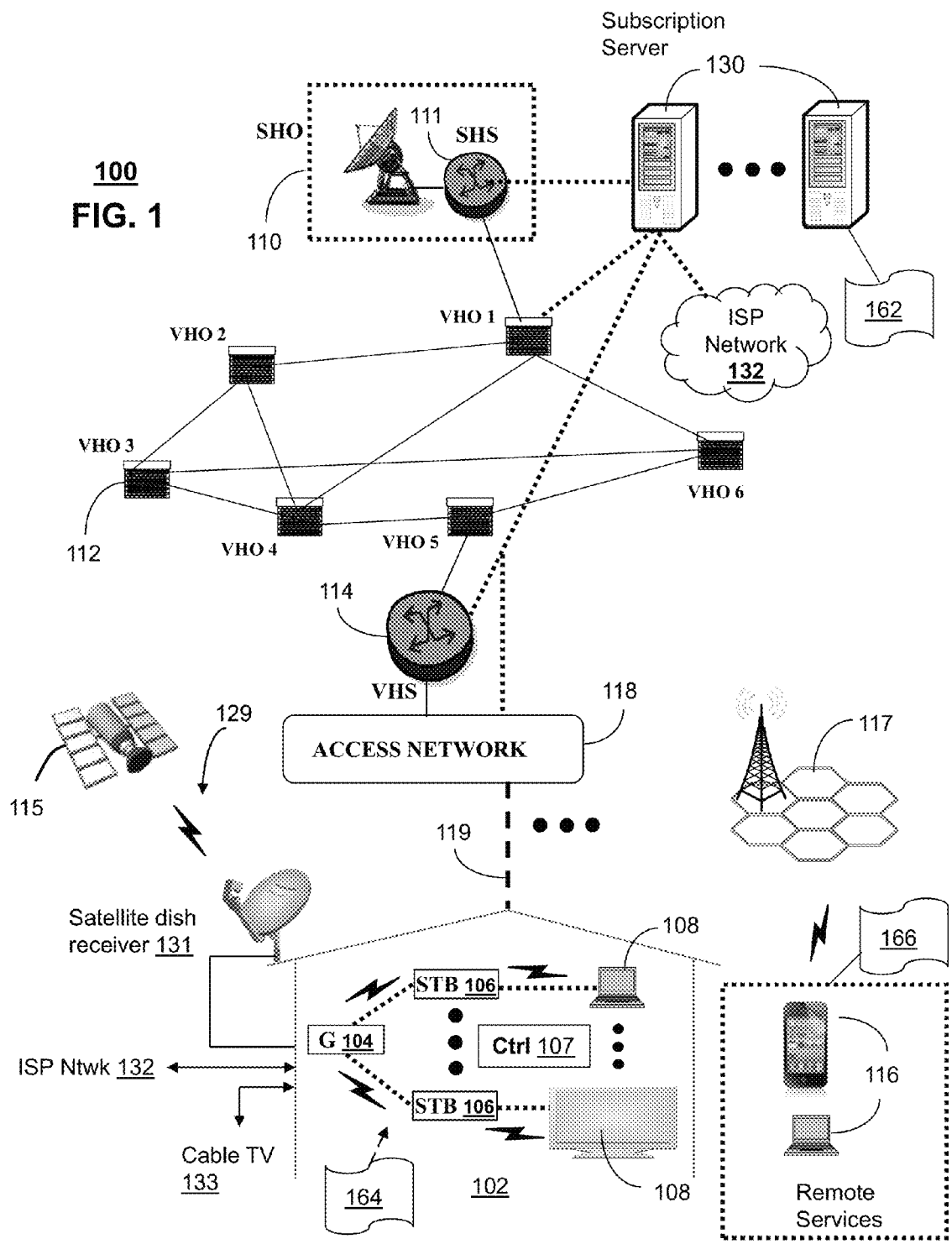
FIGS. 1-2 depict illustrative embodiments of communication systems that provide media services.

The subject disclosure describes, among other things, illustrative embodiments for activation of communication devices for operation in communication networks. Other embodiments are contemplated by the subject disclosure.

One embodiment of the subject disclosure includes a security identity module having a memory storing computer instructions, and a processor coupled to the memory. The processor, responsive to executing the computer instructions, can perform operations that can include receiving a digital root certificate locking the communication device to a network provider and storing the digital root certificate in the memory. The processor can also perform operations for receiving a digitally signed security identifier for a prospective subscriber of the communication device comprising prospective subscriber identifying information that is digitally signed using the digital root certificate. The processor can further perform operations for receiving a digitally signed security identifier for a prospective subscriber of the communication device comprising prospective subscriber identifying information that is digitally signed using the digital root certificate. The processor can perform operations for receiving a certificate revocation status associated with the digital root certificate from a certificate authority. The certificate revocation status can include one of a revoked status or a non-revoked status. The processor can perform operations for disabling activation of the communication device responsive to the received certificate revocation status comprising the revoked status. The processor can further perform operations for determining if the received digitally signed security identifier for the prospective subscriber is valid by way of a digital verification of the digitally signed security identifier according to the stored digital root certificate responsive to the received certificate revocation status comprising the non-revoked status. In turn, the processor can perform operations for enabling activating of the communication device for the prospective subscriber to operate over a network of the network provider responsive to determining that the digitally signed security identifier for the prospective subscriber is valid.

One embodiment of the subject disclosure includes a computer-readable storage medium including computer instructions which, responsive to being executed by at least one processor of a subscriber identity module, cause the at least one processor to perform operations that can include storing a digital root certificate locking the communication device to a network provider. The at least one processor can also perform operations for receiving a digitally signed security identifier for a prospective subscriber of the communication device comprising prospective subscriber identifying information that is digitally signed using the digital root certificate. The at least one processor can further perform operations for transmitting a request to a certificate authority for a certificate revocation status associated with the digital root certificate. The at least one processor can perform operations for receiving the certificate revocation status associated with the digital root certificate from the certificate authority. The certificate revocation status can include one of a revoked status or a non-revoked status. The at least one processor can, in turn, perform operations for disabling activation of the communication device responsive to the received certificate revocation status comprising the revoked status.

One embodiment of the subject disclosure is a method that can include storing, by a universal integrated circuit card (UICC) including at least one processor, a digital root certificate locking a communication device to a network provider and disabling, by the UICC, an activation of the communication device responsive to receiving an indication of a revocation of the stored digital root certificate from a certificate authority. The indication of the revocation of the stored digital root certificate can be associated with a revocation of permission for an identity authority to issue security activation information to the communication device on behalf of the network provider.

FIG. 1 depicts an illustrative embodiment of a first communication system 100 for delivering media content. The communication system 100 can represent an Internet Protocol Television (IPTV) media system. Communication system 100 can also provide for all or a portion of the computing devices 130 to function as an activation server (herein referred to as activation server 130). The activation server 130 can use computing and communication technology to perform function 162, which can include among other things, transmitting or causing an identity provider to transmit a digital root certificate to lock a communication device 116 to a network provider of the communication system 100. A security identification module of the communication device 116 can store the digital root certificate in a subscriber identity module of the communication device 116. The activation server 130 can further transmit, or cause an identity provider to transmit, to the communication device 116 a digitally signed security identifier for a prospective subscriber of the communication device 116. The digitally signed security identifier can include prospective subscriber identifying information that is digitally signed using the digital root certificate.

The subscriber identity module of the communication device 116 can further request from a certificate authority a certificate revocation status associated with the stored digital root certificate responsive to receiving the digitally signed security identifier for the prospective subscriber. The subscriber identity module of the communication device 116 can validate the stored digital root certificate according to the certificate revocation status from the certificate authority. The subscriber identity module can also validate the received digitally signed security identifier for the prospective subscriber according to the stored digital root certificate. In turn, the subscriber identity module can perform operations for activating the communication device 116 for the prospective subscriber to operate over the communication network 100 of the network provider responsive to the validation of the digitally signed security identifier for the prospective subscriber.

The media processors 106 and wireless communication devices 116 can be adapted with software functions 164 and 166, respectively, to utilize the services of activation server 130. The IPTV media system can include a super head-end office (SHO) 110 with at least one super headend office server (SHS) 111 which receives media content from satellite and/or terrestrial communication systems. In the present context, media content can represent, for example, audio content, moving image content such as 2D or 3D videos, video games, virtual reality content, still image content, and combinations thereof. The SHS server 111 can forward packets associated with the media content to one or more video head-end servers (VHS) 114 via a network of video head-end offices (VHO) 112 according to a common multicast communication protocol.

The VHS 114 can distribute multimedia broadcast content via an access network 118 to commercial and/or residential buildings 102 housing a gateway 104 (such as a residential or commercial gateway). The access network 118 can represent a group of digital subscriber line access multiplexers (DSLAMs) located in a central office or a service area interface that provide broadband services over fiber optical links or copper twisted pairs 119 to buildings 102. The gateway 104 can use common communication technology to distribute broadcast signals to media processors 106 such as Set-Top Boxes (STBs) which in turn present broadcast channels to media devices 108 such as computers or television sets managed in some instances by a media controller 107 (such as an infrared or RF remote controller).

The gateway 104, the media processors 106, and media devices 108 can utilize tethered communication technologies (such as coaxial, powerline or phone line wiring) or can operate over a wireless access protocol such as Wireless Fidelity (WiFi), Bluetooth, Zigbee, or other present or next generation local or personal area wireless network technologies. By way of these interfaces, unicast communications can also be invoked between the media processors 106 and subsystems of the IPTV media system for services such as video-on-demand (VoD), browsing an electronic programming guide (EPG), or other infrastructure services.

A satellite broadcast television system 129 can be used also in the media system of FIG. 1. The satellite broadcast television system can be overlaid, operably coupled with, or replace the IPTV system as another representative embodiment of communication system 100. In this embodiment, signals transmitted by a satellite 115 carrying media content can be received by a satellite dish receiver 131 coupled to the building 102. Modulated signals received by the satellite dish receiver 131 can be transferred to the media processors 106 for demodulating, decoding, encoding, and/or distributing broadcast channels to the media devices 108. The media processors 106 can be equipped with a broadband port to the ISP network 132 to enable interactive services such as VoD and EPG as described above.

In yet another embodiment, an analog or digital cable broadcast distribution system such as cable TV system 133 can be overlaid, operably coupled with, or replace the IPTV system and/or the satellite TV system as another representative embodiment of communication system 100. In this embodiment, the cable TV system 133 can also provide Internet, telephony, and interactive media services.

It is contemplated that the subject disclosure can apply to other present or next generation over-the-air and/or landline media content services system.

Some of the network elements of the IPTV media system can be coupled to one or more computing devices 130, a portion of which can operate as a web server for providing web portal services over an Internet Service Provider (ISP) network 132 to wireline media devices 108 or wireless communication devices 116.

It is further contemplated that multiple forms of media services can be offered to media devices over landline technologies such as those described above. Additionally, media services can be offered to media devices by way of a wireless access base station 117 operating according to common wireless access protocols such as Global System for Mobile or GSM, Code Division Multiple Access or CDMA, Time Division Multiple Access or TDMA, Universal Mobile Telecommunications or UMTS, World interoperability for Microwave or WiMAX, Software Defined Radio or SDR, Long Term Evolution or LTE, and so on. Other present and next generation wide area wireless network technologies are contemplated by the subject disclosure.

The controller 106 can utilize computing technologies such as a microprocessor, a digital signal processor (DSP), and/or a video processor with associated storage memory such as Flash, ROM, RAM, SRAM, DRAM or other storage technologies for executing computer instructions, controlling, and processing data supplied by the aforementioned components of the communication device 100.

The controller 106 can be communicatively coupled to a device 115 that can supply telemetry data (e.g., an automobile, a utility meter, etc.). In one embodiment, the communication device 100 can be an integral part of the device 115. In another embodiment, the communication device 100 can be co-located and communicatively coupled to the device 115 by way of a physical or wireless communication interface.

Figure 2:
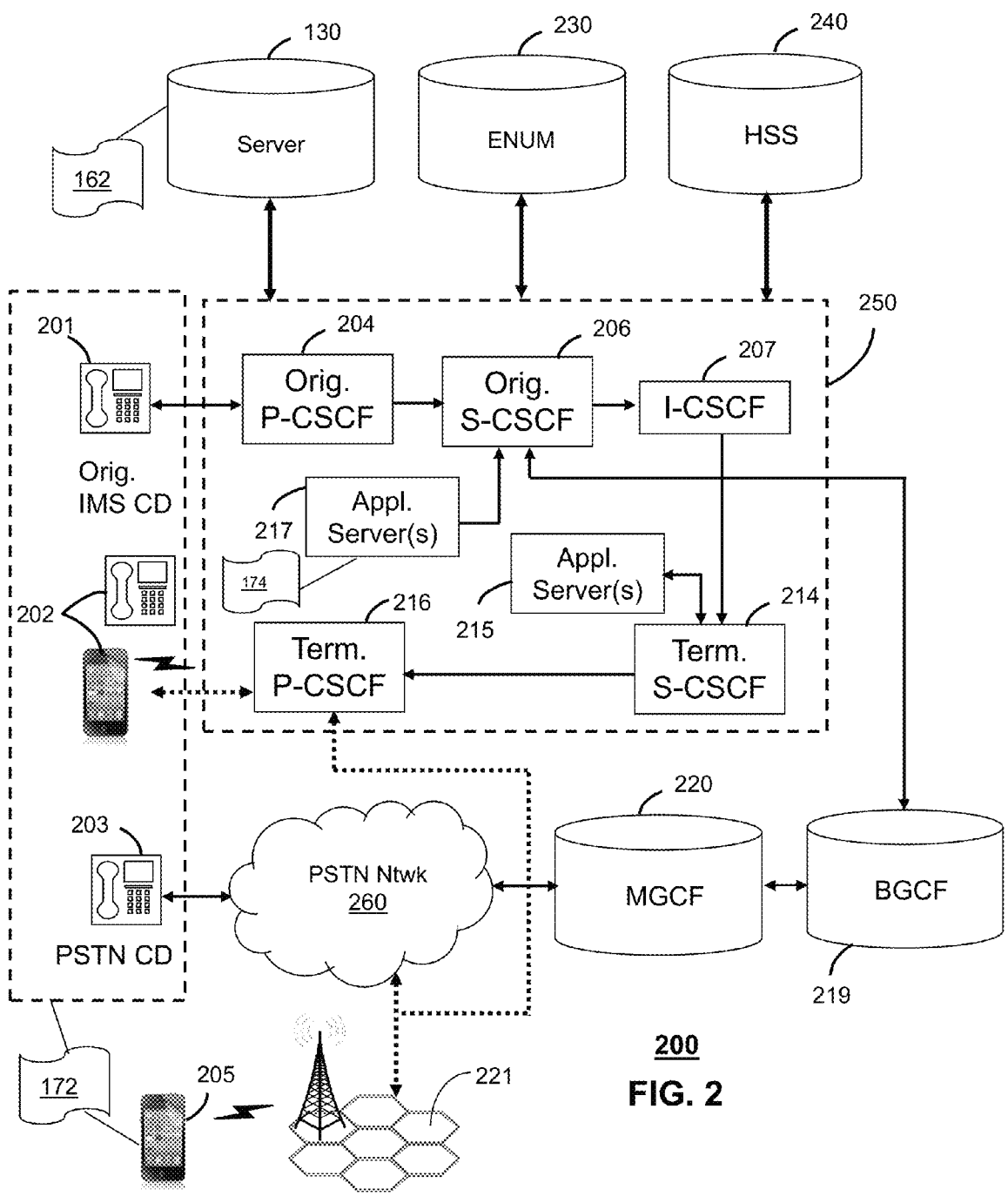

FIG. 2 depicts an illustrative embodiment of a communication system 200 employing an IP Multimedia Subsystem (IMS) network architecture to facilitate the combined services of circuit-switched and packet-switched systems. Communication system 200 can be overlaid or operably coupled with communication system 100 as another representative embodiment of communication system 100.

Communication system 200 can comprise a Home Subscriber Server (HSS) 240, a tElephone NUmber Mapping (ENUM) server 230, and other common network elements of an IMS network 250. The IMS network 250 can establish communications between IMS-compliant communication devices (CDs) 201, 202, Public Switched Telephone Network (PSTN) CDs 203, 205, and combinations thereof by way of a Media Gateway Control Function (MGCF) 220 coupled to a PSTN network 260. The MGCF 220 need not be used when a communication session involves IMS CD to IMS CD communications. A communication session involving at least one PSTN CD may utilize the MGCF 220.

IMS CDs 201, 202 can register with the IMS network 250 by contacting a Proxy Call Session Control Function (P-CSCF) which communicates with an interrogating CSCF (I-CSCF), which in turn, communicates with a Serving CSCF (S-CSCF) to register the CDs with the HSS 240. To initiate a communication session between CDs, an originating IMS CD 201 can submit a Session Initiation Protocol (SIP INVITE) message to an originating P-CSCF 204 which communicates with a corresponding originating S-CSCF 206. The originating S-CSCF 206 can submit the SIP INVITE message to one or more application servers (as) 217 that can provide a variety of services to IMS subscribers.

For example, the application servers 217 can be used to perform originating call feature treatment functions on the calling party number received by the originating S-CSCF 206 in the SIP INVITE message. Originating treatment functions can include determining whether the calling party number has international calling services, call ID blocking, calling name blocking, 7-digit dialing, and/or is requesting special telephony features (e.g., *72 forward calls, *73 cancel call forwarding, *67 for caller ID blocking, and so on). Based on initial filter criteria (iFCs) in a subscriber profile associated with a CD, one or more application servers may be invoked to provide various call originating feature services.

Additionally, the originating S-CSCF 206 can submit queries to the ENUM system 230 to translate an E.164 telephone number in the SIP INVITE message to a SIP Uniform Resource Identifier (URI) if the terminating communication device is IMS-compliant. The SIP URI can be used by an Interrogating CSCF (I-CSCF) 207 to submit a query to the HSS 240 to identify a terminating S-CSCF 214 associated with a terminating IMS CD such as reference 202. Once identified, the I-CSCF 207 can submit the SIP INVITE message to the terminating S-CSCF 214. The terminating S-CSCF 214 can then identify a terminating P-CSCF 216 associated with the terminating CD 202. The P-CSCF 216 may then signal the CD 202 to establish Voice over Internet Protocol (VoIP) communication services, thereby enabling the calling and called parties to engage in voice and/or data communications. Based on the iFCs in the subscriber profile, one or more application servers may be invoked to provide various call terminating feature services, such as call forwarding, do not disturb, music tones, simultaneous ringing, sequential ringing, etc.

In some instances the aforementioned communication process is symmetrical. Accordingly, the terms "originating" and "terminating" in FIG. 2 may be interchangeable. It is further noted that communication system 200 can be adapted to support video conferencing. In addition, communication system 200 can be adapted to provide the IMS CDs 201, 202 with the multimedia and Internet services of communication system 100 of FIG. 1.

If the terminating communication device is instead a PSTN CD such as CD 203 or CD 205 (in instances where the cellular phone only supports circuit-switched voice communications), the ENUM system 230 can respond with an unsuccessful address resolution which can cause the originating S-CSCF 206 to forward the call to the MGCF 220 via a Breakout Gateway Control Function (BGCF) 219. The MGCF 220 can then initiate the call to the terminating PSTN CD over the PSTN network 260 to enable the calling and called parties to engage in voice and/or data communications.

It is further appreciated that the CDs of FIG. 2 can operate as wireline or wireless devices. For example, the CDs of FIG. 2 can be communicatively coupled to a cellular base station 221, a femtocell, a WiFi router, a DECT base unit, or another suitable wireless access unit to establish communications with the IMS network 250 of FIG. 2. The cellular access base station 221 can operate according to common wireless access protocols such as Global System for Mobile (GSM), Code Division Multiple Access (CDMA), Time Division Multiple Access (TDMA), Universal Mobile Telecommunications (UMTS), World interoperability for Microwave (WiMAX), Software Defined Radio (SDR), Long Term Evolution (LTE), and so on. Other present and next generation wireless network technologies are contemplated by the subject disclosure. Accordingly, multiple wireline and wireless communication technologies are contemplated for the CDs of FIG. 2.

It is further contemplated that cellular phones supporting LTE can support packet-switched voice and packet-switched data communications and thus may operate as IMS-compliant mobile devices. In this embodiment, the cellular base station 221 may communicate directly with the IMS network 250 as shown by the arrow connecting the cellular base station 221 and the P-CSCF 216.

It is further understood that alternative forms of a CSCF can operate in a device, system, component, or other form of centralized or distributed hardware and/or software. Indeed, a respective CSCF may be embodied as a respective CSCF system having one or more computers or servers, either centralized or distributed, where each computer or server may be configured to perform or provide, in whole or in part, any method, step, or functionality described herein in accordance with a respective CSCF. Likewise, other functions, servers and computers described herein, including but not limited to, the HSS and ENUM server, the BGCF, and the MGCF, can be embodied in a respective system having one or more computers or servers, either centralized or distributed, where each computer or server may be configured to perform or provide, in whole or in part, any method, step, or functionality described herein in accordance with a respective function, server, or computer.

The activation server 130 of FIG. 1 can be operably coupled to the second communication system 200 for purposes similar to those described above. It is further contemplated by the subject disclosure that activation server 130 can perform function 162 and thereby manage subscription services for the CDs 201, 202, 203 and 205 of FIG. 2. CDs 201, 202, 203 and 205, which can be adapted with software to perform function 172 to utilize the services of the activation server 130. It is further contemplated that the activation server 130 can be an integral part of the application server(s) 217 performing function 174, which can be substantially similar to function 162 and adapted to the operations of the IMS network 250.

Figure 3:
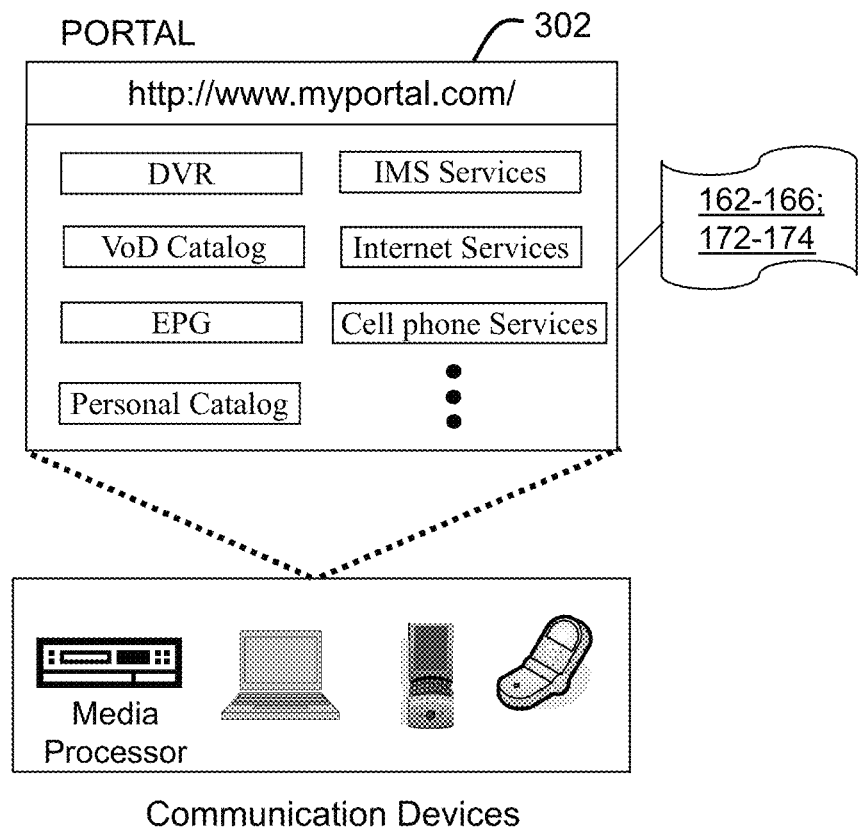
FIG. 3 depicts an illustrative embodiment of a web portal for interacting with the communication systems of FIGS. 1-2.

FIG. 3 depicts an illustrative embodiment of a web portal 302 which can be hosted by server applications operating from the computing devices 130 of the communication system 100 illustrated in FIG. 1. The web portal 302 can be used for managing services of communication systems 100-200. A web page of the web portal 302 can be accessed by a Uniform Resource Locator (URL) with an Internet browser such as Microsoft's Internet Explorer™, Mozilla's Firefox™, Apple's Safari™, or Google's Chrome™ using an Internet-capable communication device such as those described in FIGS. 1-2. The web portal 302 can be configured, for example, to access a media processor 106 and services managed thereby such as a Digital Video Recorder (DVR), a Video on Demand (VoD) catalog, an Electronic Programming Guide (EPG), or a personal catalog (such as personal videos, pictures, audio recordings, etc.) stored at the media processor 106. The web portal 302 can also be used for provisioning IMS services described earlier, provisioning Internet services, provisioning cellular phone services, and so on.

It is contemplated by the subject disclosure that the web portal 302 can further be utilized to manage and provision software applications 162-166, and 172-174, such as receiving and presenting media content, and to adapt these applications as may be desired by subscribers and service providers of communication systems 100-200.

Figure 4:
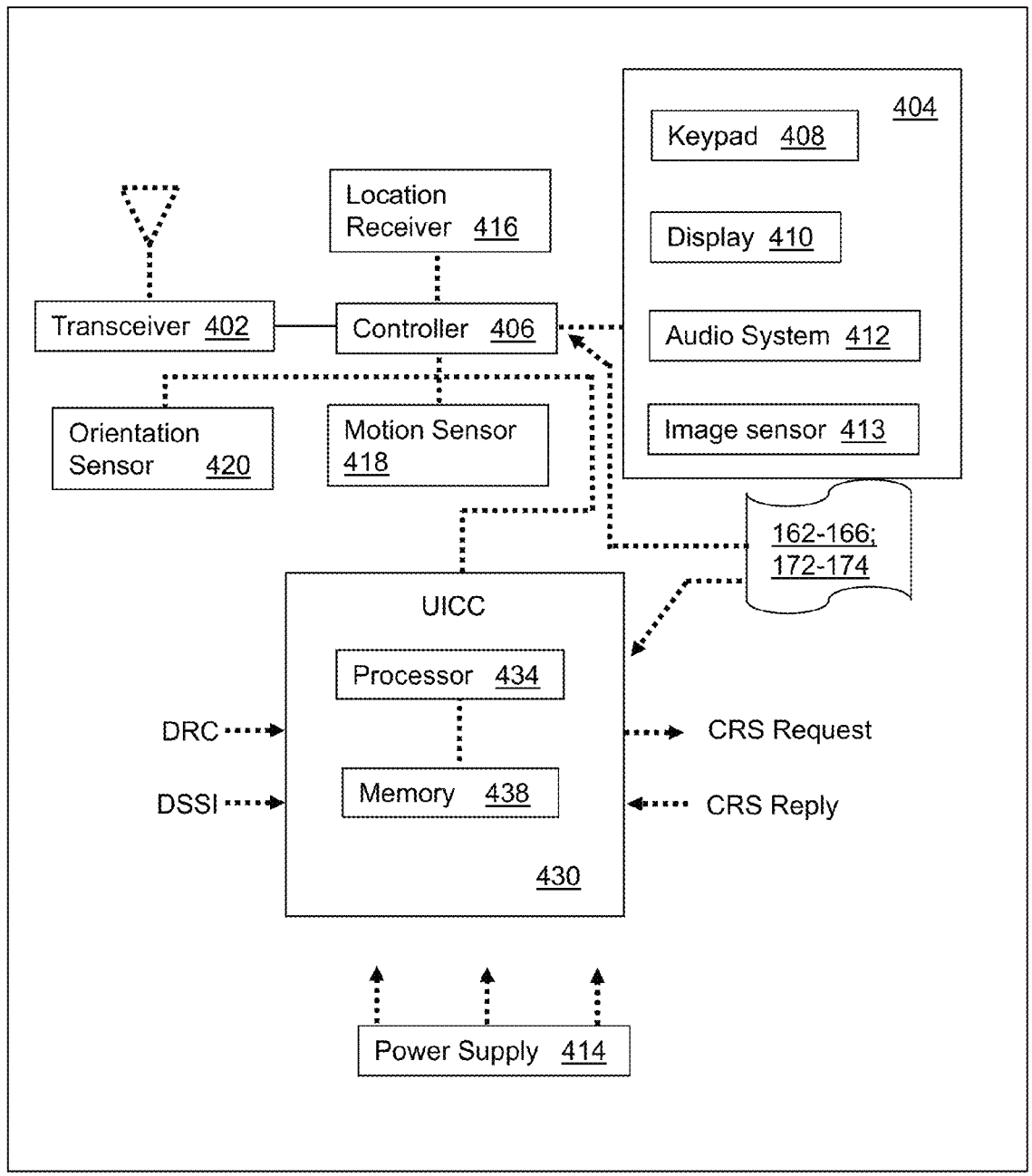
FIG. 4 depicts an illustrative embodiment of a communication device including a subscriber identity module to manage activation of the communication device for use in the communication systems of FIGS. 1-2.

FIG. 4 depicts an illustrative embodiment of a communication device 400. Communication device 400 can serve in whole or in part as an illustrative embodiment of the devices depicted in FIGS. 1-2. The communication device 400 can comprise a wireline and/or wireless transceiver 402 (herein transceiver 402), a user interface (UI) 404, a power supply 414, a location receiver 416, a motion sensor 418, an orientation sensor 420, and a controller 406 for managing operations thereof. The transceiver 402 can support short-range or long-range wireless access technologies such as Bluetooth, ZigBee, WiFi, Digital Enhanced Cordless Telecommunications (DECT), or cellular communication technologies, just to mention a few. Cellular technologies can include, for example, CDMA-1X, UMTS/HSDPA, GSM/GPRS, TDMA/EDGE, EV/DO, WiMAX, software defined radio (SDR), Long Term Evolution (LTE), as well as other next generation wireless communication technologies as they arise. The transceiver 402 can also be adapted to support circuit-switched wireline access technologies (such as PSTN), packet-switched wireline access technologies (such as TCP/IP, VoIP, etc.), and combinations thereof.

The UI 404 can include a depressible or touch-sensitive keypad 408 with a navigation mechanism such as a roller ball, a joystick, a mouse, or a navigation disk for manipulating operations of the communication device 400. The keypad 408 can be an integral part of a housing assembly of the communication device 400 or an independent device operably coupled thereto by a tethered wireline interface (such as a USB cable) or a wireless interface supporting for example Bluetooth. The keypad 408 can represent a numeric keypad commonly used by phones, and/or a QWERTY keypad with alphanumeric keys. The UI 404 can further include a display 410 such as monochrome or color LCD (Liquid Crystal Display), OLED (Organic Light Emitting Diode) or other suitable display technology for conveying images to an end user of the communication device 400. In an embodiment where the display 410 is touch-sensitive, a portion or all of the keypad 408 can be presented by way of the display 410 with navigation features. The display 404 can include an array of display pixels for the presenting visual information and/or media content. The display pixels can color or monochromatic.

The display 410 can use touch screen technology to also serve as a user interface for detecting user input (e.g., touch of a user's finger). As a touch screen display, the communication device 400 can be adapted to present a user interface with graphical user interface (GUI) elements that can be selected by a user with a touch of a finger. The touch screen display 410 can be equipped with capacitive, resistive or other forms of sensing technology to detect much surface area of a user's finger has been placed on a portion of the touch screen display. This sensing information can be used control the manipulation of the GUI elements.

The UI 404 can also include an audio system 412 that utilizes common audio technology for conveying low volume audio (such as audio heard only in the proximity of a human ear) and high volume audio (such as speakerphone for hands free operation). The audio system 412 can further include a microphone for receiving audible signals of an end user. The audio system 412 can also be used for voice recognition applications. The UI 404 can further include an image sensor 413 such as a charged coupled device (CCD) camera for capturing still or moving images.

The power supply 414 can utilize common power management technologies such as replaceable and rechargeable batteries, supply regulation technologies, and charging system technologies for supplying energy to the components of the communication device 400 to facilitate long-range or short-range portable applications. Alternatively, the charging system can utilize external power sources such as DC power supplied over a physical interface such as a USB port. The location receiver 416 can utilize common location technology such as a global positioning system (GPS) receiver capable of assisted GPS for identifying a location of the communication device 400 based on signals generated by a constellation of GPS satellites, thereby facilitating common location services such as navigation. The motion sensor 418 can utilize motion sensing technology such as an accelerometer, a gyroscope, or other suitable motion sensing to detect motion of the communication device 400 in three-dimensional space. The orientation sensor 420 can utilize orientation sensing technology such as a magnetometer to detect the orientation of the communication device 400 (North, South, West, East, combined orientations thereof in degrees, minutes, or other suitable orientation metrics).

The communication device 400 can use the transceiver 402 to also determine a proximity to a cellular, WiFi, Bluetooth, or other wireless access points by common sensing techniques such as utilizing a received signal strength indicator (RSSI) and/or a signal time of arrival (TOA) or time of flight (TOF). The controller 406 can utilize computing technologies such as a microprocessor, a digital signal processor (DSP), and/or a video processor with associated storage memory such as Flash, ROM, RAM, SRAM, DRAM or other storage technologies.

Other components not shown in FIG. 4 are contemplated by the subject disclosure. For instance, the communication device 400 can include a reset button (not shown). The reset button can be used to reset the controller 406 of the communication device 400. In yet another embodiment, the communication device 400 can also include a factory default setting button positioned below a small hole in a housing assembly of the communication device 400 to force the communication device 400 to re-establish factory settings. In this embodiment, a user can use a protruding object such as a pen or paper clip tip to reach into the hole and depress the default setting button.

The communication device 400 as described herein can operate with more or less components described in FIG. 4. These variant embodiments are contemplated by the subject disclosure.

The communication device 400 can be adapted to perform the functions of the media processor 106, the media devices 108, or the portable communication devices 116 of FIG. 1, as well as the IMS CDs 201-202 and PSTN CDs 203-205 of FIG. 2. It will be appreciated that the communication device 400 can also represent other common devices that can operate in communication systems 100-200 of FIGS. 1-2 such as a gaming console and a media player.

It is contemplated by the subject disclosure that the communication device 400 shown in FIG. 4 or portions thereof can serve as a representation of one or more of the devices of communication systems 100-200. It is further contemplated that the controller 406 can be adapted in various embodiments to perform the functions 162-166 and 172-174, such as receiving and presenting media content. In one embodiment, the communication device 400 can include a universal integrated circuit care (UICC) 430.

The UICC 430 can include a processor 434 and a memory 438. The memory 438 can store computer instructions for the processor 434 to execute. The memory 438 can also store subscriber identity information for use in securely activating the communication device 400 for use in a network 100 of a network provider. Depending on the communication protocol or the applicable use of the UICC 430, the UICC 430 can be referred to as a subscriber identity module (SIM), a Removable User Identity Module (RUIM), an embedded UICC (eUICC), an embedded SIM (eSIM), and so on.

In one embodiment, the UICC 430 can be a non-removable UICC. A non-removable UICC 430 can be a card or module or device or combination of devices that are integrated into the communications device 400. A non-removable UICC 430 can be mechanically and electrically affixed to the communication device 400. For example, a non-removable UICC 430 can be a card or module that is soldered onto a printed circuit board of the communication device 400.

In another embodiment, a software-based UICC 430 can be generated via embedded software that can be stored in a segregated memory 434 to prevent tampering. For example, a ROM-based code may not be used to store embedded UICC software or secret information in memory 434. A software-based UICC 430 can utilize one or more processors of the communication device 400 to perform the functions of the UICC 430 via software that is embedded into operational code of the communication device 400 that is segregated to the UICC memory 434, or a combination thereof.

In another embodiment, the UICC 430 can be a removable UICC. A removable UICC 430 can be installed and removed from the communication device 400 as would a SIM card. However, the removable UICC 430 differs from a typical SIM card by incorporating functionality to allow an activation capability of an installed UICC 430 to be revoked via a revocation of a digital root certificate. In one embodiment, a removable UICC 430 can be installed into the communication device 400 by electrically coupling the UICC 430 and the communication device 400 in cooperation with a temporary mechanical attachment. Present and next generation physical and operational variants of the UICC 430 are also contemplated by the present disclosure.

In one embodiment, the UICC 430 can control activation of the communication device 400. In one embodiment, a network provider can lock a communication device 400 such that it can only be used on a network 100 of that provider. For example, the locking can include a network provider purchasing or subsidizing the purchase of a communication device 400 for exclusive use by a prospective subscriber of the network 100 of the network provider. Once the communication devices 400 is purchased, or subsidized, by the network provider, then the network provider can restrict activation of the communication devices 400 to its network 100. In one embodiment, a digital root certificate (DRC) can be used for controlling activation of the communication device 400. In one embodiment, a DRC can be a digitally encrypted data sequence that is supplied to the UICC 430 from a trusted source and then stored in the UICC memory 438. In one embodiment, the DRC can be provisioned onto the UICC 430 while the UICC is a module, or card, separate from the communication device 430. The DRC-provisioned UICC 430 can then be united with the communication device 400, either permanently (e.g., by soldering the module or card to the communication device 400) or removably (e.g., by installing the UICC 430 as a removable card). In another embodiment, the UICC 430 can be provisioned with the DRC after it is united to the communication device 400. In another embodiment, a software-based UICC 430 can be a provisioned with the DRC after the communication device 400 is manufactured.

In one embodiment, the DRC is supplied to the communication device 400 by a certificate authority. For example, a certificate authority can be coupled to the UICC 430 through the communication device 400 over a secure data link. The DRC can be uploaded by the UICC 430 from the certificate authority. In another embodiment, the UICC 430 can be coupled to an identity provider that is trusted by the network provider. Again, a secure data link can be used for uploading the DRC from the identity provider. In one embodiment, the identity provider can be a manufacturer of hardware for the UICC 430, such as an entire card or components or tamper-proof memory that are installed into the communication device 400. In one embodiment, the identity provider can be an entity separate from the UICC 430 hardware manufacturer. For example, the identity provider can simply be a trusted data source for the network provider.

In one embodiment, the UICC 430 can use the stored DRC to lock and/or unlock the communication device 400. In one embodiment, the UICC 430 can be configured to allow a communication device 400 to be activated for subscriber use only if a proper identifier is provided to the UICC 430. For example, the UICC 430 can condition activation of the communication device 400 on receiving and validating a digitally signed security identifier (DSSI). The DSSI can include identification information, such as an identification of the subscriber, a unique address or phone number, and/or an identifier for the network. The identification information of the DSSI can be digitally signed, or mathematically encrypted, using a copy of the DRC. In one embodiment, the received DSSI can be validated at the UICC 430 by mathematically decrypting the digital signature using the DRC that is stored in the UICC 430. In one embodiment, when the received DSSI is validated, the UICC 430 activates the communication device 400 for use by the subscriber on the network provider's network. In one embodiment, the DSSI can be sent to the communication device 400 after the UICC 430 has been provisioned with the DRC. In one embodiment, the DSSI is provided to the communication device 400 by a trusted identity provider. In one embodiment, the network provider can provide subscriber information to the trusted identity provider for use in generating the DSSI.

In one embodiment, a revocation status for the DRC that has been provisioned to the UICC 430 can be checked prior to digital verification of the DSSI using the DRC. In one embodiment, a DRC that has been provisioned to the UICC 430 can be revoked by the network provider, after the DRC has been loaded into the UICC memory 438. For example, the network provider can decide to terminate or alter an arrangement whereby the network provider has given permission to a trusted identity provider to generated and/or transmit DSSI codes to communication devices 400 on behalf of the network provider. If this termination or alteration of a trust arrangement occurs after a DRC issued for use by the identity provider has been stored in the communication device 400, then it is desirable (from the viewpoint of the network provider) to have a means for to prevent activation of the communication device based on the stored DRC. Alternatively, the network provider can desire a means to prevent activation of a communication device 400 that bears a potentially compromised DRC.

In one embodiment, the network provider can revoke a previously issued DRC, after it has been downloaded and stored into the UICC memory 438. For example, the network provider can communicate a revocation of the DRC to a trusted certificate authority that authoritatively issues DRC data and that tracks the status of the DRC data. In one embodiment, the certificate authority can revoke a DRC that was issued on behalf of the network provider. Once the DRC is revoked, the certificate authority can report the revoked status of the DRC in response to any status query made to the certificate authority server. In one embodiment, the UICC 430 can query the certificate authority for a certificate response status (CRS) associated with a DRC that is stored in the UICC memory 438. In one embodiment, the UICC 430 can perform the DRC status query prior to validating any received DSSI. If the certificate authority reports that the stored DRC has been revoked, then the UICC 430 can disable activation of the communication device 400 based on the now-revoked DRC. In one embodiment, the UICC 430 can optionally delete the stored DRC from the UICC memory 438. If the DRC is not reported as revoked, then the UICC 430 can proceed to validation of the received DSSI. If the DRC is revoked, a new DRC can be provisioned to the communication device 400 from another trusted source, such as a different trusted identity provider.

Figure 5:
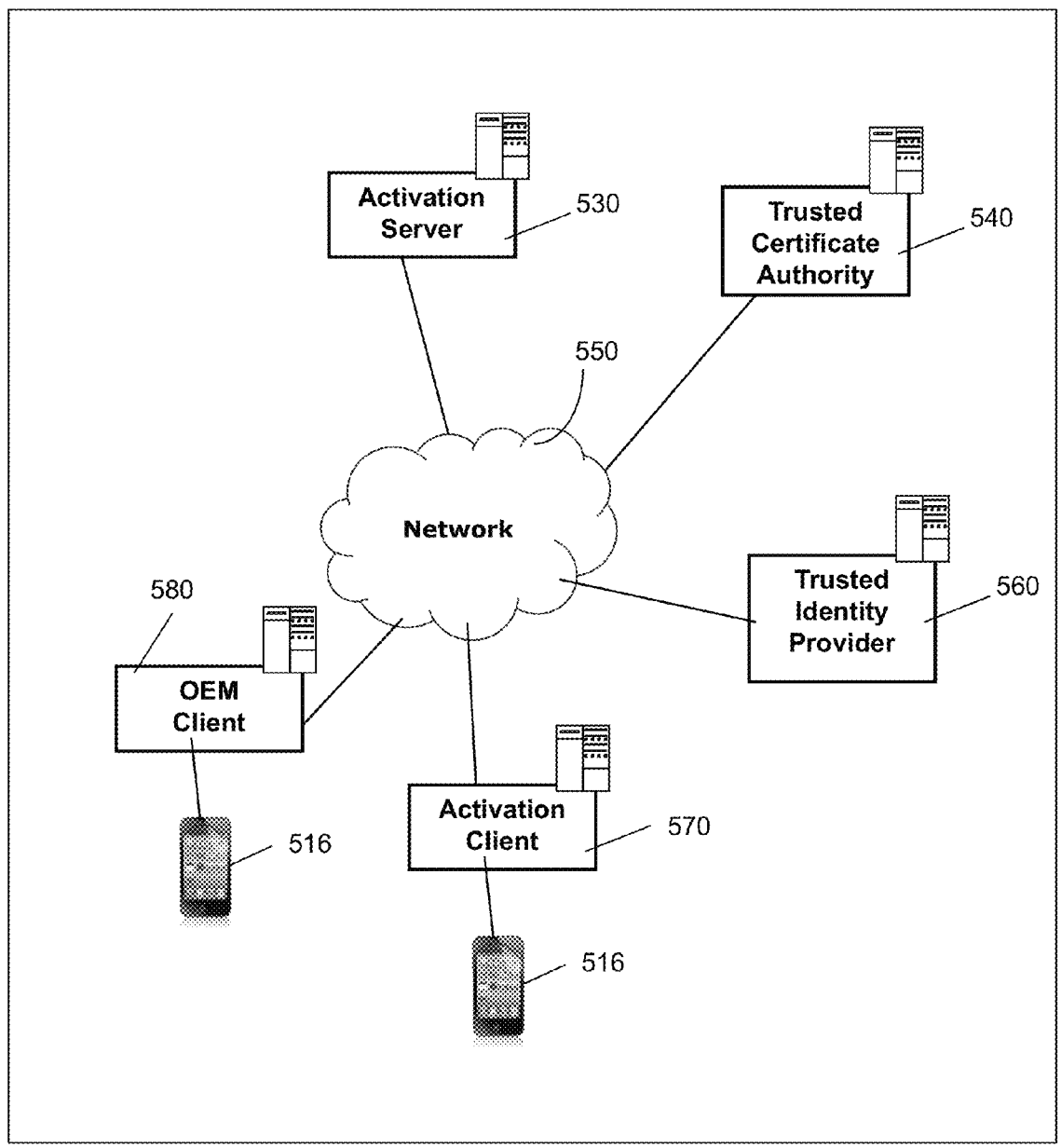
FIG. 5 depicts an illustrative embodiment of a system for activating the communication device of FIG. 4 for use in the communication systems of FIGS. 1-2.
Figure 6:
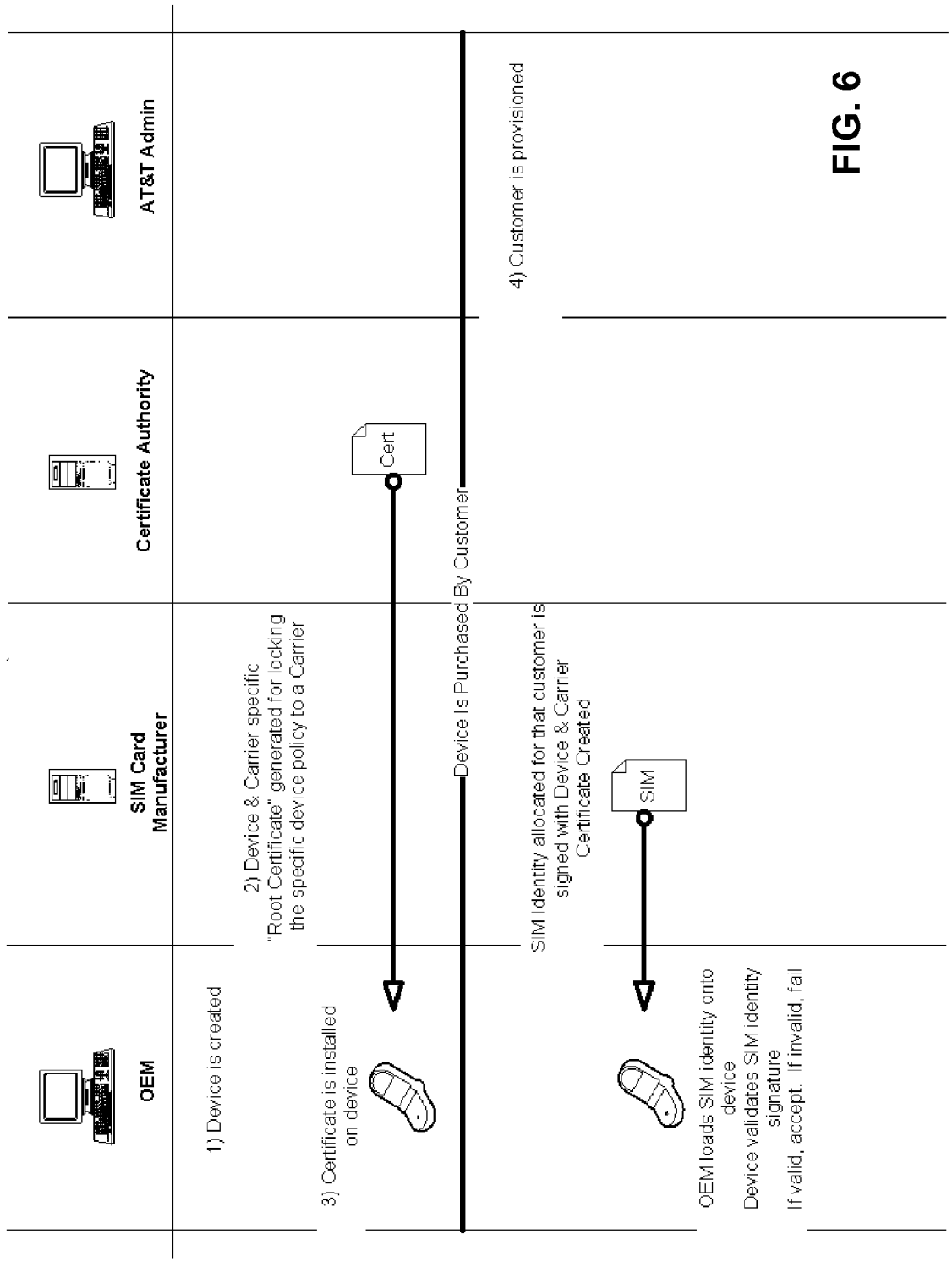
FIGS. 6-7 depict illustrative embodiments of sequence diagrams for controlling activation of the communication device of FIG. 4 using the system of FIG. 5.
Figure 7:
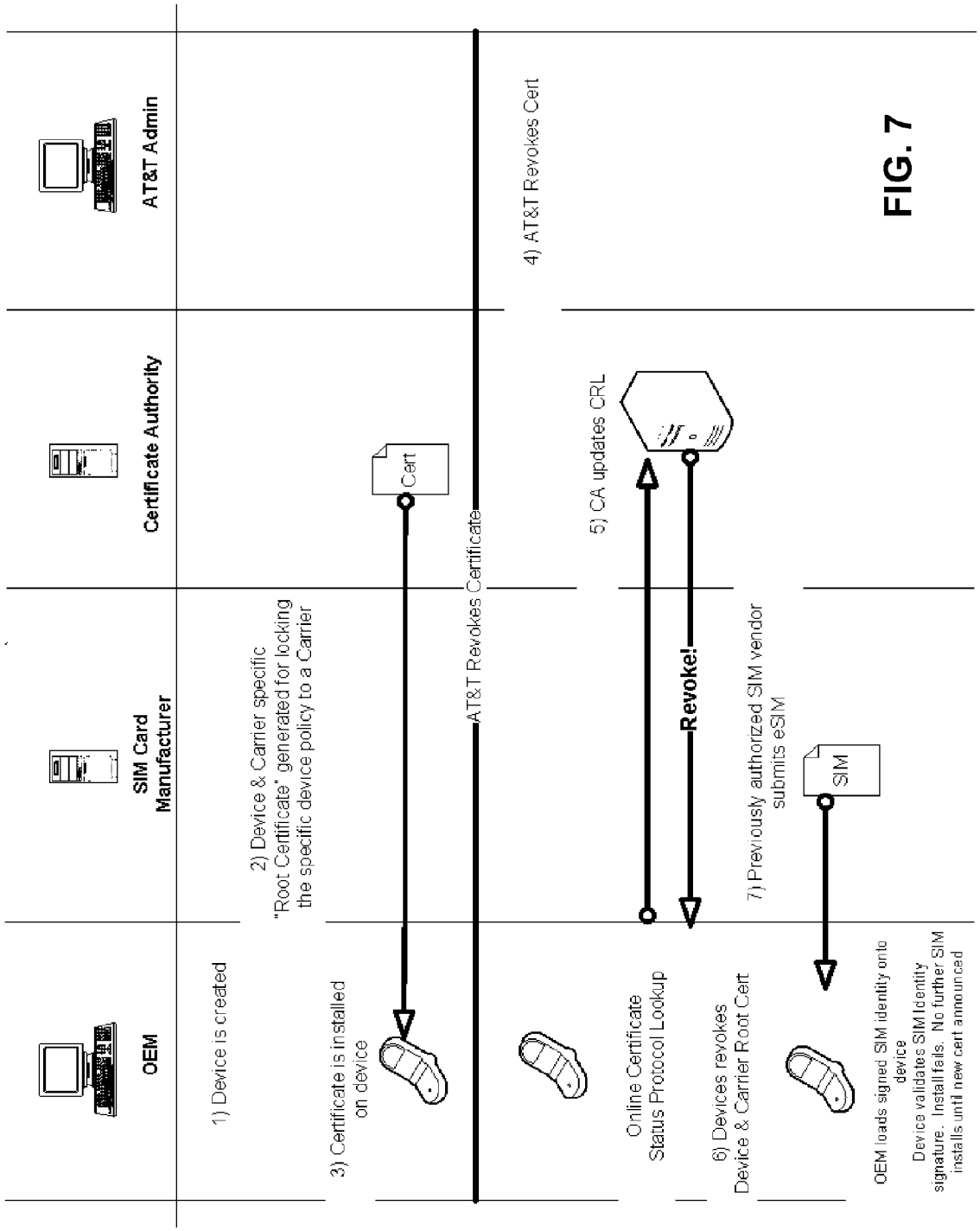

FIG. 5 depicts an illustrative embodiment of a system 500 for activating the communication device of FIG. 4 for use in the communication systems of FIGS. 1-2. In addition, FIGS. 6-7 depict illustrative embodiments of sequence diagrams for controlling activation of the communication device of FIG. 4 using the activation system of FIG. 5. In one embodiment, a communication device 516 can represent a consumer device such as a cellular telephone, a computer or laptop. Alternatively, the communication device 516 can be including in a second apparatus, such as a vending machine, a utility meter, a parking meter, a commercial transport vehicle, or an automobile. A UICC 430 can be included in each of the embodied communication devices 516 as described above.

In one embodiment, the system 500 can include an activation server 530, a trusted certificate authority 540, a trusted identity provider 560, an activation client 570, and/or an original equipment manufacturer (OEM) client 580 communicatively coupled by a network 550. In one embodiment, a secure network 550 can be used that shields protects interparty communications from public access. In another embodiment, all or part of the network can be a public network, such as the world-wide web.

In one embodiment, the activation server 530 can be controlled by the network provider. In one embodiment, the activation server 530 can request that the trusted certificate authority issue digital root certificates (DRC) for communication devices 516 that have been purchased or subsidized by the network provider. In one embodiment, the trusted certificate authority is an independent and authoritative third party that can issue, recognize, provide status for, and revoke digital certificates for many parties. The activation server 530 can provide identification information to the trusted certificate authority 540, such as serial numbers of communication devices 516 and/or UICCs 430 and/or network identifiers. The trusted certificate authority 540 can, in turn, encrypt the identification information into each DRC for issuance to each communication device 516. In one embodiment, the trusted certificate authority 540 can issue the generated DRCs to the trusted identity provider 560. In another embodiment, the trusted certificate authority 540 can issue the DRCs directly to the activation client 570. In an alternative embodiment, the trusted identity provider 560 can generate the DRCs and then report these generated DRCs to the trusted certificate authority 540 for tracking.

In one embodiment, non-removable UICCs 430 are integrated into the design of the communication device 516 and are manufactured either by the OEM of the communication device 516 or by a third party UICC module manufacturer that provides UICCs 430 without identifiers. In these embodiments, the trusted identity provider 560 can provide unique DRCs to the OEM client 580 for provisioning the non-removable UICCs 430. In one embodiment, each unique DRC can be downloaded into each non-removable UICC 430 in a communication device 400 that is communicatively coupled to the OEM client 480.

In one embodiment, the trusted identity provider 560 can be tasked with providing removable UICCs 430 for the communication devices 516. In this embodiment, the trusted identity provider can provision each removable UICC 430 with a unique DRC locked to the network provider. In this embodiment, the provisioned, removable UICCs 430 can then be provided to the OEM for the communication devices for insertion into the communication devices or the provided cards 430 can be mated to communication devices 516 by the network provider or by a third party.

When a prospective subscriber to a network 100 of the network provider has been identified, then, in one embodiment, the activation server 530 can provide subscriber identification information, such as a subscriber name, account number, phone number, communication device serial number, and/or network identifier, to the trusted identity provider 560. In one embodiment, the trusted identity provider 560 can then generate a digitally signed security identifier (DSSI) for the subscriber. In on embodiment, the activation server 530 can generate the DSSI and provide the DSSI to the trusted identity provider 560 for forwarding. In one embodiment, the trusted identity provider 560 can provide a DSSI generated using a specific DRC to an activation client 570 that is communicatively coupled to a targeted communication device that is holding a copy of the specific DRC. In this embodiment, the activation client 570 can download the DSSI into the communication device 516.

In one embodiment, the reception at the communication device 516 of the DSSI can trigger the UICC 430 of the communication device 516 to attempt to verify the status of the DRC stored at the UICC memory 438. In one embodiment, the UICC 430 of the communication device 516 can request a certificate response status (CRS) from the trusted certificate authority 540 and can thereby determine if the DRC has been revoked by the network provider. In one embodiment, the activation client 570 can automatically request the CRS from the trusted certificate authority 540.

If the DRC is verified as active (not revoked), then the UICC 430 of the communication device 516 can validate the received DSSI against the stored DRC. If the DSSI is valid, then the UICC 430 of the communication device 400 can enable activation of the communication device for the network. However, if the DRC is revoked or the DSSI is invalid, then the UICC 430 can prohibit activation of the communication device 400.

Figure 8:
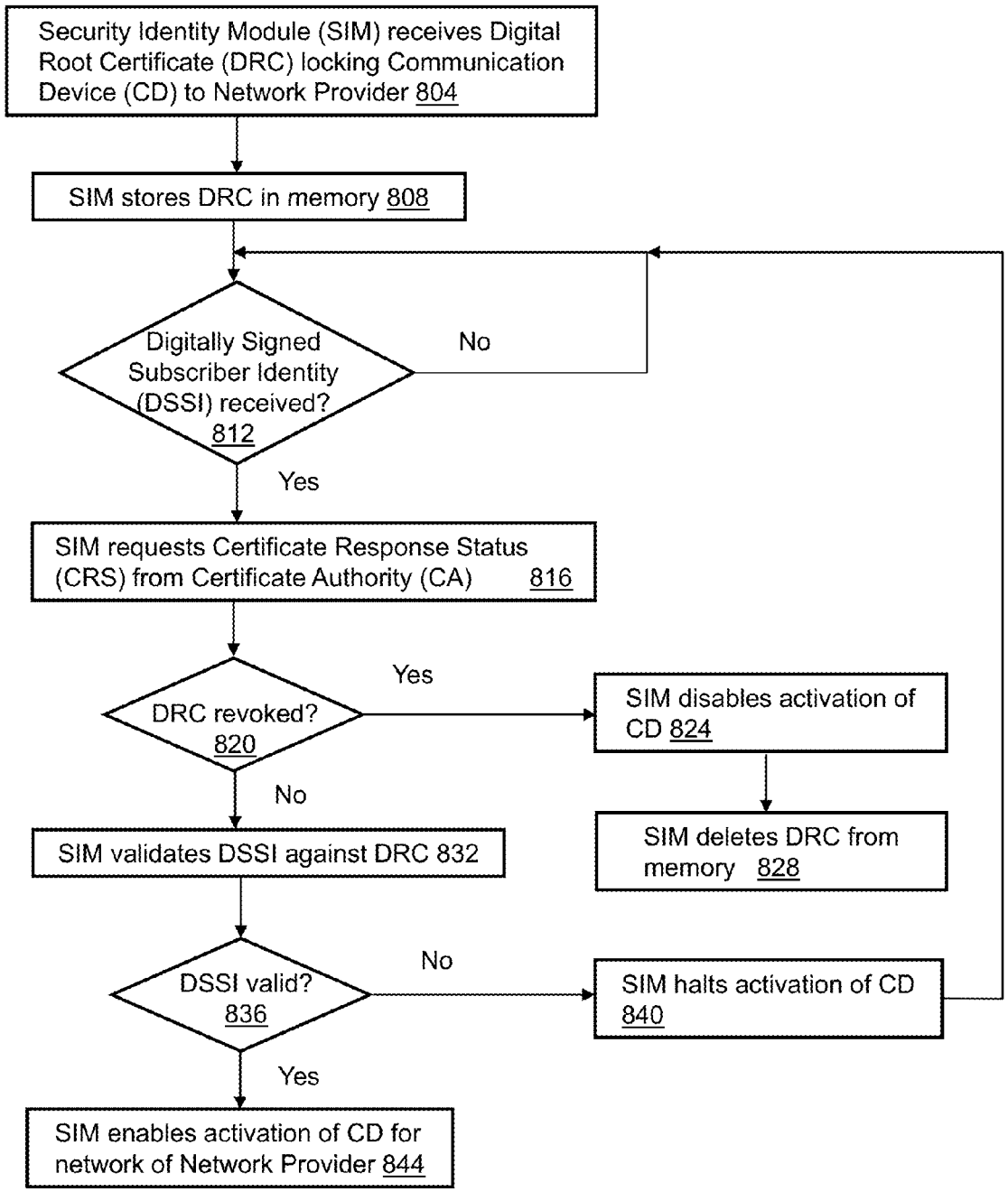
FIG. 8 depicts an illustrative embodiment of a method for selectively activating the communication device of FIG. 4 for operation in the communication systems of FIGS. 1-2.

FIG. 8 depicts an illustrative embodiment of a method 800 for activating the communication device of FIG. 4 using the systems and sequence diagrams of FIGS. 5-7. Method 800 can begin with step 804 in which the subscriber identity module (UICC) 430 can receive a digital root certificate (DRC) locking the communication device 516 to the network provider. The DRC can be sent by a trusted certificate authority 540, an activation server 530 of the network provider, or a third-party trusted identity provider 560. In step 808, the UICC 430 can store the received DRC into the UICC memory 438. In step 812, the UICC 430 can detect if a digitally signed subscriber identity (DSSI) has been received by the communication device 516 bearing the UICC 430. The DSSI can be sent to the communication device 516 by the trusted identity provider. If the UICC 430 does not detect a received DSSI, then the UICC 430 continues monitoring (if the communication device is powered). However, if the DSSI is detected, then the UICC 430 can request a certificate response status (CRS) from the trusted certificate authority in step 816. The trusted certificate authority can use the CRS to report a status for any DRC in the authority tracking database.

In step 820, the UICC 430 can check to see if the authority reports a status of revoked for the DRC that is stored in the UICC memory 438. If the DRC has been revoked, then the UICC 430 can disable activation of the communication device 400 in step 824. In one embodiment, the UICC 430 can also delete the DRC from the UICC memory 438 in step 828. If the UICC 430 determines from the CRS that the DRC is active (not revoked), then the UICC 430 can validate the received DSSI against the DRC in step 832. In one embodiment, the UICC 430 can digitally verify the DSSI against the DRC. For example, the UICC 430 can use a private key in the DRC to verify the DSSI. If the UICC 430 determines that the DSSI is not valid in step 836, then the UICC 430 halts activation of the communication device 516 in step 840. However, if the UICC 430 validates the DSSI in step 836, then the UICC 430 enable activation of the communication device 516 in step 844.

Upon reviewing these embodiments, it would be evident to an artisan with ordinary skill in the art that said embodiments can be modified, reduced, or enhanced without departing from the scope and spirit of the claims described below. In one embodiment, the DRC can include a timing parameter. When the DRC is issued by the trusting certificate authority, then the DRC can have a built-in expiration date after which the DRC is no longer valid. In one embodiment, the UICC 430 can be configured to disable all activation of the communication device 516 whenever the DRC has expired. In one embodiment, the UICC 430 can be configured to disable validation checking against the DRC whenever the DRC has expired. In this embodiment, the communication device 400 can be unlocked from the network provider. In one embodiment, the network provider can alter an initial DRC expiration date or can alter the DRC expiration date based on a payment by a subscriber of additional fees to thereby provide an early unlocking of the communication device from the network provider.

In one embodiment, a prospective subscriber can activate a communication device 400 by coupling the device to a computing device and accessing an activation client application via a portal 302. Other embodiments are contemplated by the subject disclosure.

Figure 9:
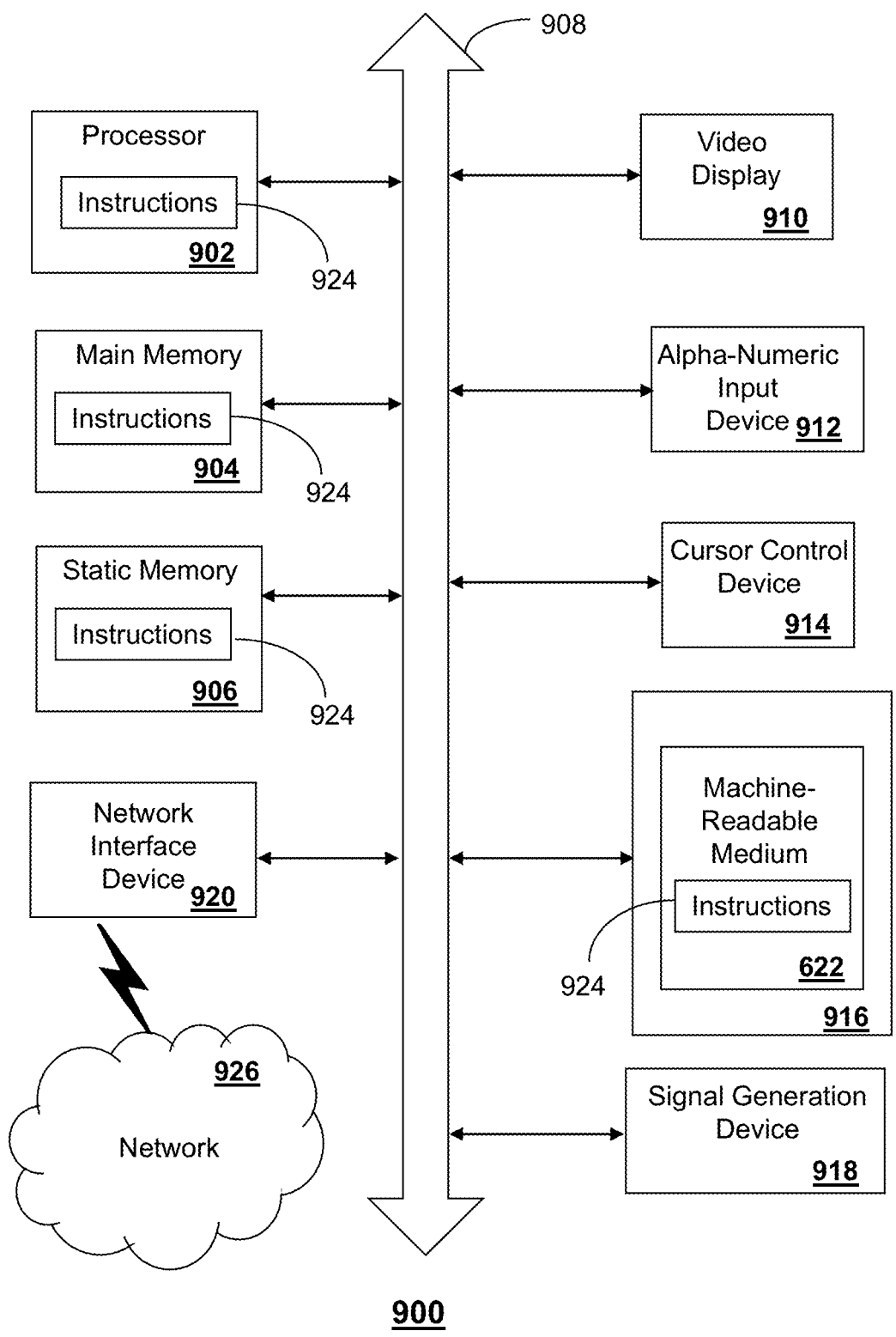
FIG. 9 is a diagrammatic representation of a machine in the form of a computer system within which a set of instructions, when executed, may cause the machine to perform any one or more of the methods described herein.

FIG. 9 depicts an exemplary diagrammatic representation of a machine in the form of a computer system 900 within which a set of instructions, when executed, may cause the machine to perform any one or more of the methods discussed above. One or more instances of the machine can operate, for example, as the communication devices 100 and 400 of FIGS. 1 and 4, their respective subcomponents, such as the UICC. In some embodiments, the machine may be connected (e.g., using a network) to other machines. In a networked deployment, the machine may operate in the capacity of a server or a client user machine in server-client user network environment, or as a peer machine in a peer-to-peer (or distributed) network environment.

The machine may comprise a server computer, a client user computer, a personal computer (PC), a tablet PC, a smart phone, a laptop computer, a desktop computer, a control system, a network router, switch or bridge, or any machine capable of executing a set of instructions (sequential or otherwise) that specify actions to be taken by that machine. It will be understood that a communication device of the subject disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methods discussed herein.

The computer system 900 may include a processor 902 (e.g., a central processing unit (CPU), a graphics processing unit (GPU, or both), a main memory 904 and a static memory 906, which communicate with each other via a bus 908. The computer system 900 may further include a video display unit 910 (e.g., a liquid crystal display (LCD), a flat panel, or a solid state display. The computer system 900 may include an input device 912 (e.g., a keyboard), a cursor control device 914 (e.g., a mouse), a disk drive unit 916, a signal generation device 918 (e.g., a speaker or remote control) and a network interface device 920.

The disk drive unit 916 may include a tangible computer-readable storage medium 922 on which is stored one or more sets of instructions (e.g., software 924) embodying any one or more of the methods or functions described herein, including those methods illustrated above. The instructions 924 may also reside, completely or at least partially, within the main memory 904, the static memory 906, and/or within the processor 902 during execution thereof by the computer system 900. The main memory 904 and the processor 902 also may constitute tangible computer-readable storage media.

Dedicated hardware implementations including, but not limited to, application specific integrated circuits, programmable logic arrays and other hardware devices can likewise be constructed to implement the methods described herein. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the subject disclosure, the methods described herein are intended for operation as software programs running on a computer processor. Furthermore, software implementations can include, but not limited to, distributed processing or component/object distributed processing, parallel processing, or virtual machine processing can also be constructed to implement the methods described herein.

While the tangible computer-readable storage medium 922 is shown in an example embodiment to be a single medium, the term "tangible computer-readable storage medium" should be taken to include a single medium or multiple media (e.g., a centralized or distributed database, and/or associated caches and servers) that store the one or more sets of instructions. The term "tangible computer-readable storage medium" shall also be taken to include any non-transitory medium that is capable of storing or encoding a set of instructions for execution by the machine and that cause the machine to perform any one or more of the methods of the subject disclosure.

The term "tangible computer-readable storage medium" shall accordingly be taken to include, but not be limited to: solid-state memories such as a memory card or other package that houses one or more read-only (non-volatile) memories, random access memories, or other re-writable (volatile) memories, a magneto-optical or optical medium such as a disk or tape, or other tangible media which can be used to store information. Accordingly, the disclosure is considered to include any one or more of a tangible computer-readable storage medium, as listed herein and including art-recognized equivalents and successor media, in which the software implementations herein are stored.

Although the present specification describes components and functions implemented in the embodiments with reference to particular standards and protocols, the disclosure is not limited to such standards and protocols. Each of the standards for Internet and other packet switched network transmission (e.g., TCP/IP, UDP/IP, HTML, HTTP) represent examples of the state of the art. Such standards are from time-to-time superseded by faster or more efficient equivalents having essentially the same functions. Wireless standards for device detection (e.g., RFID), short-range communications (e.g., Bluetooth, WiFi, Zigbee), and long-range communications (e.g., WiMAX, GSM, CDMA, LTE) are contemplated for use by computer system 900.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized Accordingly, the specification and drawings are to be regarded in an illustrative rather than a restrictive sense.

Although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, are contemplated by the subject disclosure.

The Abstract of the Disclosure is provided with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

The invention claimed is:

1. A universal integrated circuit card (UICC) for a communication device, the UICC comprising:
   a memory to store instructions; and
   a processor coupled to the memory, wherein the processor, responsive to executing the instructions, performs operations comprising:
   receiving a digital root certificate locking the communication device to a network provider;
   storing the digital root certificate in the memory;
   receiving over a network from a trusted identity provider having an issuing authority from the network provider a digitally signed security identifier for a prospective subscriber of the communication device, wherein the digitally signed security identifier comprises prospective subscriber identifying information that is digitally signed using the digital root certificate and wherein the digitally signed security identifier comprises network identifying information that is digitally signed using the digital root certificate;
   receiving over the network from a trusted certificate authority a certificate revocation status associated with the digital root certificate from the trusted certificate authority, wherein the certificate revocation status comprises one of a revoked status or a non-revoked status and wherein the revoked status indicates that the digital root certificate has been revoked due to a termination of the issuing authority of the trusted identity provider;
   disabling activation of the communication device according to the certificate revocation status comprising the revoked status;
   determining if the digitally signed security identifier for the prospective subscriber is valid by way of a digital verification of the digitally signed security identifier based on the digital root certificate according to the certificate revocation status comprising the non-revoked status; and
   enabling activating of the communication device for the prospective subscriber to operate over a network of the network provider according to determining that the digitally signed security identifier for the prospective subscriber is valid.

2. The UICC of claim 1, wherein the UICC is fixably attached to the communication device.

3. The UICC of claim 1, wherein the UICC is removably attached to the communication device.

4. The UICC of claim 1, wherein the processor, responsive to executing the instructions, performs operations comprising transmitting a request to the trusted certificate authority for the certificate revocation status associated with the digital root certificate responsive to a request to activate the communication device.

5. The UICC of claim 1, wherein the processor, responsive to executing the instructions, performs operations comprising deleting the digital root certificate from the memory responsive to the certificate revocation status comprising the revoked status.

6. A computer-readable storage device, comprising instructions which, responsive to being executed by a processor of a universal integrated circuit card that is non-removably installed in a communication device, cause the processor to perform operations comprising:
   storing a digital root certificate locking the communication device to a network provider;
   receiving over a network from a trusted identity provider having an issuing authority from the network provider a digitally signed security identifier for a prospective subscriber of the communication device comprising prospective subscriber identifying information that is digitally signed using the digital root certificate;

transmitting a request to a trusted certificate authority for a certificate revocation status associated with the digital root certificate;

receiving over the network from the trusted certificate authority the certificate revocation status associated with the digital root certificate, wherein the certificate revocation status comprises one of a revoked status or a non-revoked status and wherein the revoked status indicates that the digital root certificate has been revoked according to a termination of the issuing authority of the trusted identity provider; and disabling activation of the communication device according to the certificate revocation status comprising the revoked status.

7. The computer-readable storage device of claim 6, further comprising instructions which, when executed by the processor, cause the processor to perform operations comprising determining if the digitally signed security identifier for the prospective subscriber is valid by way of a digital verification of the digitally signed security identifier according to the digital root certificate according to the certificate revocation status comprising the non-revoked status.

8. The computer-readable storage device of claim 7, further comprising instructions which, when executed by the processor, cause the processor to perform operations comprising enabling activating of the communication device for the prospective subscriber to operate over a communication network of the network provider responsive to determining that the digitally signed security identifier for the prospective subscriber is valid.

9. A method, comprising:

storing, by a universal integrated circuit card (UICC) comprising a processor, a digital root certificate locking a communication device to a network provider;

receiving, by the UICC, over a network from a trusted identity provider having an issuing authority from the network provider a digitally signed security identifier for a prospective subscriber of the communication device comprising prospective subscriber identifying information that is digitally signed using the digital root certificate;

transmitting, by the UICC, a request to a trusted certificate authority for a certificate revocation status associated with the digital root certificate;

receiving, by the UICC, over the network from the trusted certificate authority the certificate revocation status associated with the digital root certificate, wherein the certificate revocation status comprises one of a revoked status or a non-revoked status and wherein the revoked status indicates that the digital root certificate has been revoked according to a termination of the issuing authority of the trusted identity provider; and disabling, by the UICC, activation of the communication device according to the certificate revocation status comprising the revoked status.

10. The method of claim 9, comprising:

enabling, by the UICC, activation of the communication device for the prospective subscriber to operate over a communication network of the network provider according to the certificate revocation status comprising the non-revoked status.

11. The method of claim 9, wherein the digitally signed security identifier for the prospective subscriber comprises network identifying information that is digitally signed using the digital root certificate.

12. The method of claim 9, wherein the UICC comprises a component that is removably attached to the communication device, or fixably attached to the communication device.

* * * * *